Jan. 7, 1958  C. C. BALKE ET AL  2,819,163
PROCESS FOR MAKING A PYROPHORIC ELEMENT
Original Filed June 14, 1951  3 Sheets-Sheet 1
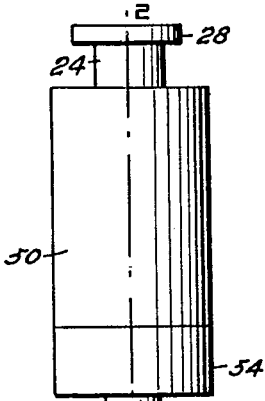
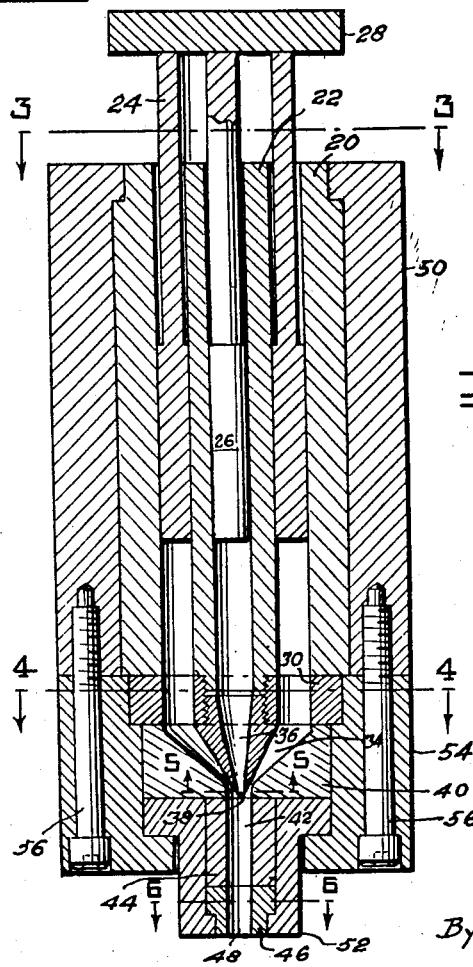
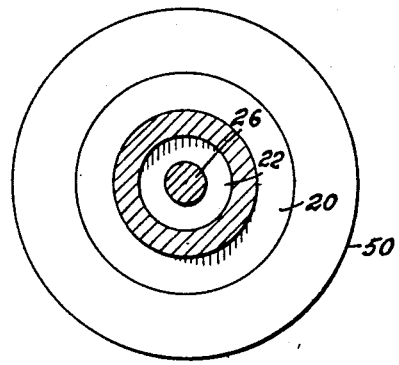
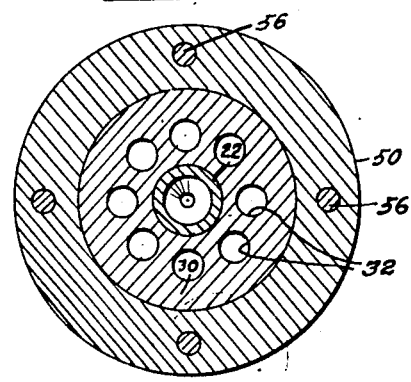
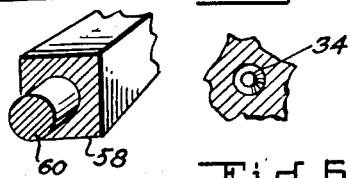
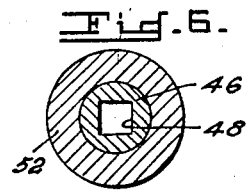
INVENTORS
Claire C. Balke
William S. Graff
By: W. E. Thibodeau & T. J. Lynch Jan. 7, 1958     C. C. BALKE ET AL     2,819,163
PROCESS FOR MAKING A PYROPHORIC ELEMENT
Original Filed June 14, 1951     3 Sheets-Sheet 2

INVENTORS,
Claire C. Balke
William S. Graff

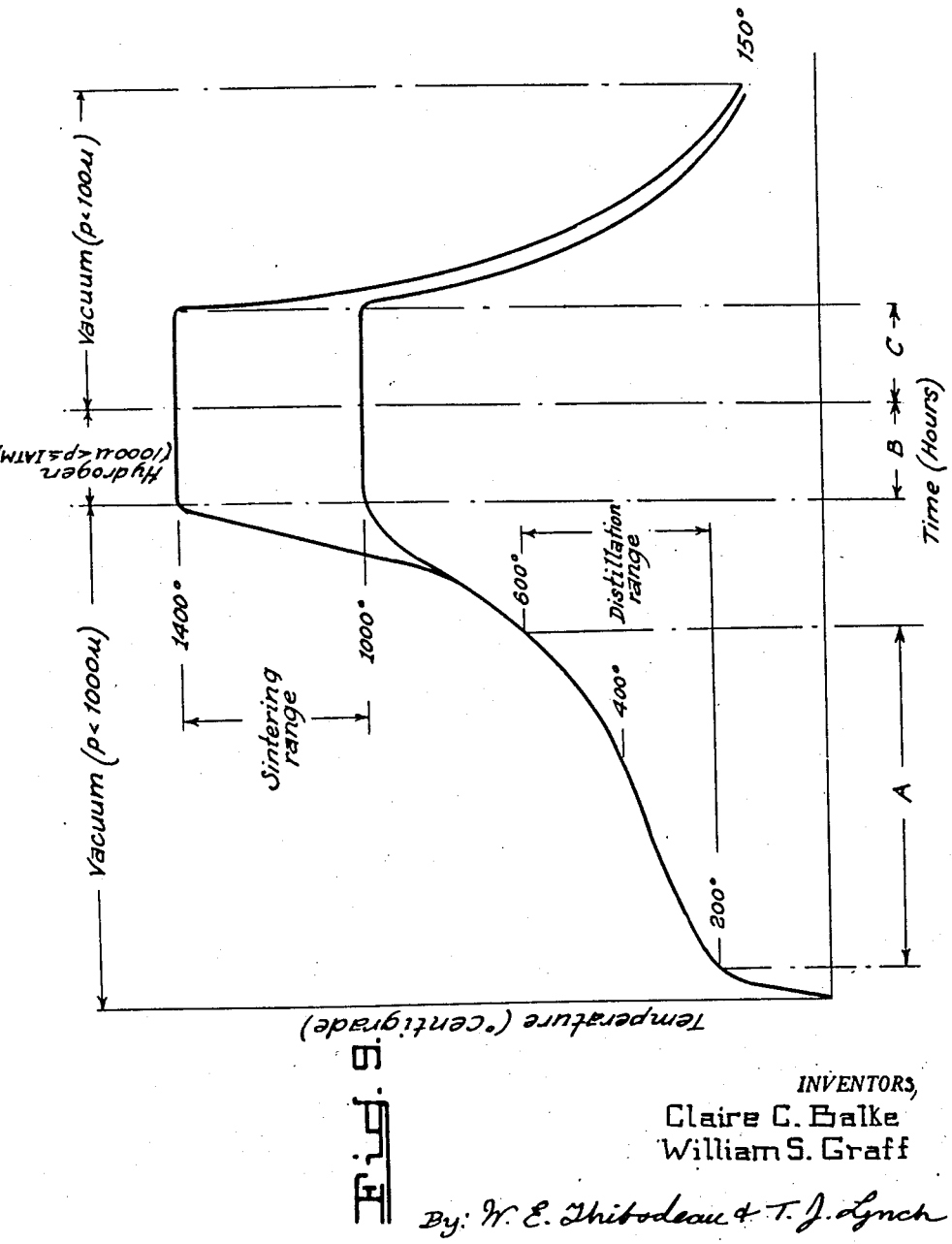

United States Patent Office 2,819,163
Patented Jan. 7, 1958

2,819,163
PROCESS FOR MAKING A PYROPHORIC ELEMENT

Claire C. Balke, Drexel Hill, and William S. Graff, Philadelphia, Pa., assignors to the United States of America as represented by the Secretary of the Army Original application June 14, 1951, Serial No. 231,596, now Patent No. 2,801,590, dated August 6, 1957. Divided and this application March 16, 1956, Serial No. 574,347

3 Claims. (Cl. 75—208)

This application is a division of our parent application Serial No. 231,596, filed on June 14, 1951, now Patent No. 2,801,590, dated August 6, 1957.

This invention relates to a process used in manufacturing a pyrophor and to the equipment and process used in manufacturing it.

Pyrophors have been well known since the days of gas illumination when they were utilized in flints for lighting the gas. While almost any metal in the finely divided state exhibits pyrophoric properties, that is, oxidizes spontaneously when exposed to air, a few metals, among which cerium is probably the best known, are of such a nature that when abraded they yield a shower of hot sparks capable of igniting a hydrocarbon vapor. As a result cerium was widely used in the gas lighter flints. Today pyrophors are common in cigarette lighters and in flints for use in chemical laboratories. The composition of the modern pyrophor varies but usually includes some of the rare earth elements, misch metal representing a popular alloy with suitable sparking qualities.

Our invention deals with pyrophors that can be used as incendiaries, particularly for military purposes. Consequently the main object of the invention is development of a pyrophor suitable as a military incendiary. Since the usual pyrophors are rather soft, they are too weak to withstand the rough usage incident to military activity. A second object of the invention is therefore provision of a pyrophor strong enough for military usage. We have found that sufficient strength can be imparted to a pyrophoric element by coating it with or encasing it in a stronger material. A third object of the invention is the development of a pyrophor strengthened by a coating of a non-pyrophoric material. A suitable form for a pyrophor meeting the requirements of our military incendiary is that of a rod coaxially coated with strengthening and protective material. A fourth object of our invention is consequently provision of a coaxial pyrophor by means of powder metallurgy. The coating can be imparted to the powdered pyrophoric material if both are extruded simultaneously and concentrically from a suitable die. Still another object of the invention is provision of a die for producing comparatively strong pyrophors by means of powder metallurgy.

Other objects of our invention will be evident from the following description and the appended drawings in which:

Figure 1 is a side elevation of the die of our invention;

Figure 2 is a vertical sectional view taken along the line 2—2 of Figure 1;

Figure 3 is a cross-section taken along the line 3—3 of Figure 2;

Figure 4 is a cross-section taken along line 4—4 of Figure 2;

Figure 6:
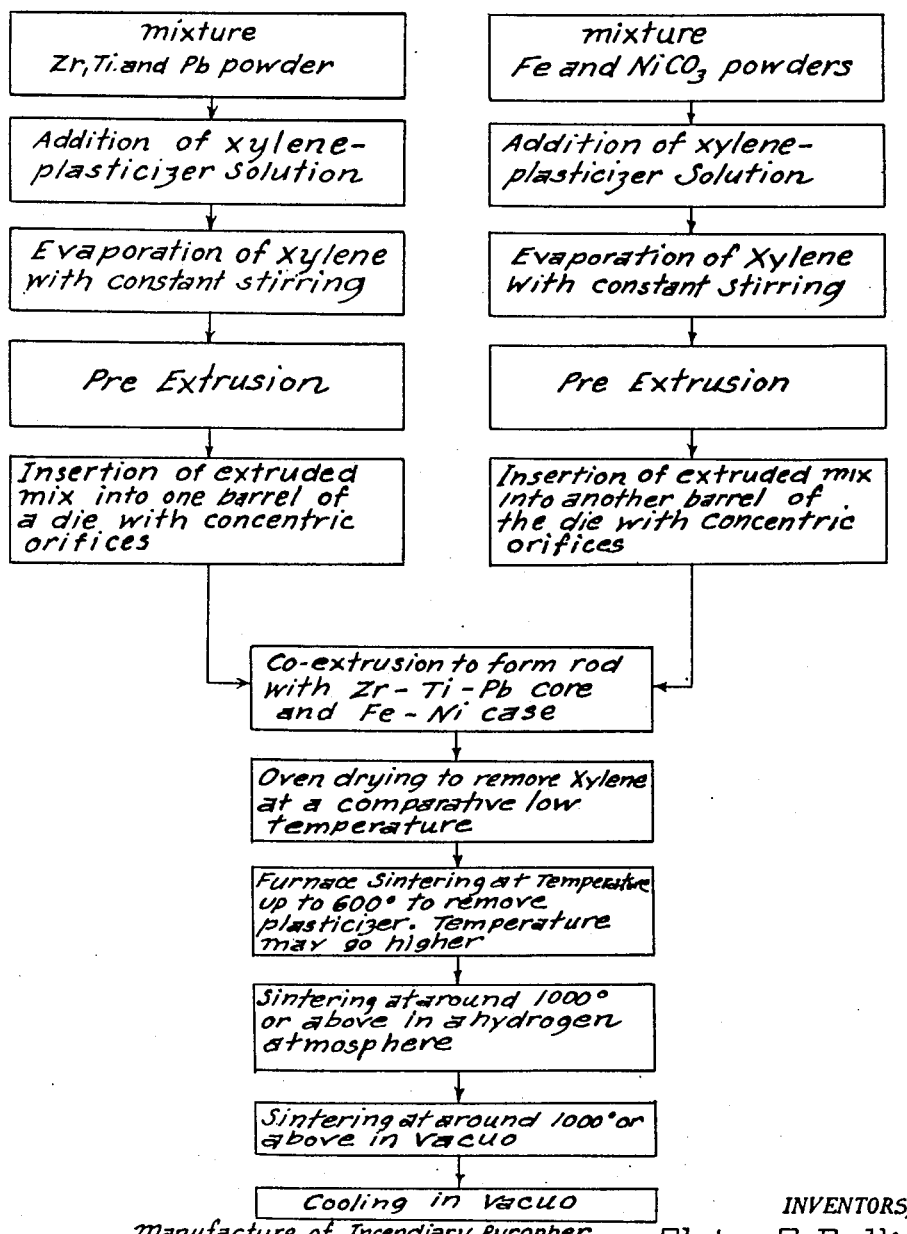

Figures 5 and 6 are sections taken along lines 5—5 and 6—6, respectively, of Figure 2;

Figure 7 is a cut-away view of one form of the extruded pyrophor;

Figure 8 is a flow sheet presenting our entire process; and

Figure 9 is a diagram presenting conditions during part of our process.

In general our pyrophoric element is a coaxial metallurgical composite with a length relatively great compared to its cross-sectional dimensions. It is composed of a core containing zirconium, such as a mixture of zirconium, titanium and lead which sparks intensely when abraded, and an enveloping ferrous case. The case imparts sufficient mechanical strength to the pyrophoric core for the composite to penetrate targets. The cross-sectional area of the core varies from 10% to about 75% of the total, 15% being found particularly advantageous. Both core and case are made highly porous by the process of manufacture, porosity extending up to about 50% for the case and to about 40% or somewhat less for the core. This process consists essentially of co-axial and simultaneous extrusion of the core and case materials as plasticized metallic powders in the cold state from a specially designed die adapted to give the proper shape and area to the desired product. An organic material such as synthetic rubber is utilized as a plasticizing agent. The plasticizer is decomposed after extrusion by sintering, leaving a porous core with incendiary properties and a case with a strong metallic structure. Details of our invention will be found in the following description.

The first step in our process consists of mixing, separately, the raw materials of the case and of the core. The main constituent of the case is electrolytic iron powder. Since the porosity of the resultant product is an important feature, the particle size of the powder must be controlled. Table I shows tolerable limits on the particle size of the iron powder determined by the mesh dimensions of column 1. Column 2 shows the limits of a particular mesh or mesh range while column 3 shows a specific example found useful.

Table I

| (1) Mesh | (2) Limits (percent) | (3) Example (percent) |
| --- | --- | --- |
| −200 to 270 | 0–20 | 14.5 |
| −270 to 325 | 0–20 | 13.5 |
| −325 | 60–100 | 72.0 |

The iron powder has a carbon content of less than about 0.25% and an oxygen content of less than about 1.0%.

Preferably nickel is employed as an alloying agent for strengthening the case. The nickel is added as $NiCO_3$ powder in the amount of from 4 to 11% of the total Fe-$NiCO_3$ mixture. The upper limit corresponds to about 5% by weight of nickel. The carbonate is blended mechanically with the iron powder by a ball mill or other means to disperse it as finely as possible.

There are many decomposable organic materials available for making the powders plastic and extrudable. Synthetic rubber known in the trade as "Perbunan" or "Paracril" is preferably utilized however. The plasticizer is added to the metallic powder in the form of a xylene solution or dispersion containing, for example, about 4% of the Perbunan in 100 cc. of solvent. For optimum plasticity, the xylene-Perbunan solution is added to the Fe-$NiCO_3$ mixture in the ratio of about 1.5 cc. to a gram of mixture to give about 6% Perbunan by weight calculated on the weight of iron.

The preferred pyrophoric powder, as stated above, consists of the three elements zirconium, titanium and lead. A particularly advantageous composition contains 35% Zr, 30% Ti and 35% Pb. The preferred Zr and Ti powders should be finer than 15 microns while the preferred Pb is —200 mesh. A xylene-Perbunan solution of the same percentage as that used above is added to the pyrophoric blend in the ratio of about 0.875 cc. of solution to a gram of powder. This ratio yields 3.5% Perbunan by weight based on the weight of powder and is calculated to provide sufficient plasticity for extrusion upon the evaporation of the solvent.

Tables 2 and 3 give the raw material limits for case and core respectively together with, in column 3, a specific example. The liquids of 500 g. Fe to 75 g. pyrophoric mixture are fixed by the design of the coaxial extrusion die yielding a core area equal to 15% of the case area. It will be understood however that with other relationships between the core and the case areas within the range set forth above, the ratio of iron to pyrophoric powder can be varied to meet the requirements of the die.

*Table II.—Case materials*

| Component | Limits | Example |
|---|---|---|
| Fe (electrolytic) | 500 g. | 500 g. |
| $NiCO_3$ | 20–55 g. (4–11%) | 24.75 g. (4.95%). |
| Perbunan | 15–40 g. (3–8%) | 30 g. (6%). |
| Xylene solution | 625–1,000 cc. | 750 cc. (4% Perbunan). |

*Table III.—Core material*

| Component | Limits | Example |
|---|---|---|
| Zr (—15 microns) | | 26.25 g. (25%). |
| Ti (—15 microns) | 75 g. | 22.5 g. (30%). |
| Pb (—200 mesh) | | 26.25 g. (35%). |
| Perbunan | 2.25–3.75 g. (3–5%) | 2.625 g. (3.5%). |
| Xylene solution | 56.25–92.75 cc. | 65.6 cc. (4% Perbunan). |

After the Perbunan solutions have been added to their respective powders, the mixtures are stirred to form more or less homogeneous slurries and then evaporated separately, with constant stirring, on steam baths. Evaporation is continued until the odor of xylene has been greatly reduced and each slurry is plastic and dough-like. In this condition the slurries are pre-extruded under about ½ to 3 tons' total pressure through a ¼" diameter orifice in an extrusion die. After this first or pre-extrusion each mass is a homogeneous blend of plasticizer and metal powder.

When the plasticized masses comprising the case and core materials have been passed through the pre-extrusion die they are inserted into the appropriate receptacles of the especially designed coaxial die of our invention. This coaxial die, described below, permits the simultaneous extrusion of case and core at the same rate of speed at their point of juncture with an extrusion ratio greater than twenty, preferably about thirty. The extrusion should take place at a total pressure of less than about ten tons and should proceed very slowly to yield the strongest possible green extrusion. The rod-like length of pyrophoric element obtained may then be coiled or otherwise shaped prior to drying in an oven at 80° C. for several hours to evaporate the residual xylene. After drying the element still retains sufficient flexibility to be handled and transported to a sintering furnace.

The essential feature of our novel coaxial extrusion die can be seen by reference to the drawings. The plasticized case material is inserted into an outer barrel 20 concentric with an inner barrel 22 serving as a container for the plasticized core material. Pressure is applied to both materials simultaneously by plungers 24 and 26 interconnected externally by platen 28. The outer barrel 20 terminates at a spider 30 which supports and aligns both barrels. Holes 32 in spider 30 join the hollow interior of barrel 20 with the outer portion 34 of an intermediate orifice 38 formed within orifice retainer 40. The inner portion 36 of the intermediate orifice 38 is the exit end of inner barrel 22. Figure 5 shows the arrangement of outlets at the intermediate orifice. Passage 42 connects the intermediate orifice 38 through tube 44 and second orifice retainer 46 to the final orifice 48. Jacket 50 and supporting rings 52 and 54, held together by screws 56, complete the die structure. At the intermediate orifice 38 the core and case materials under extrusion join coaxially at the same rate of speed, the area of the core being fixed at 15% of the case area. The ratio of barrel area to orifice area is 30 at the intermediate orifice. The element is further shaped and reduced 20% by the final orifice 48. In the die shown the barrels and intermediate orifice are of round cross-section while the final orifice (Figure 6) develops the coaxial element into a square cross-section. This element is shown in Figure 7 where the core 60 is surrounded by the square case 58. Other shapes can be developed by changing the design of the final orifice, thus producing a circular, hexagonal, ribbed or other coaxial element as desired.

The basic features of the co-extrusion die described above are as follows:

(1) The plasticized core material is contained in an inner barrel and the plasticized case material is contained in a separate outer barrel concentric with the inner one;

(2) Both barrels connect with concentric intermediate orifices in such a manner that the core and case materials are brought together at the same speed at one point, there, being a pre-calculated ratio between core area and case area at this point;

(3) There should be a pre-calculated reduction from barrel areas to intermediate orifice area to permit compaction of both components and to impart sufficient strength for handling after extrusion. The ratio of barrel cross-sectional area to intermediate orifice area should be greater than twenty;

(4) The intermediate orifices connect with a final orifice that develops the cross-sectional shape and dimensions of the final extrusion and provides for a slight final reduction in area of the coaxial shape to bring the core and case into more intimate contact. The ratio of the total intermediate orifice area to final orifice area should be greater than one but less than two so that the ratio of core area to case area will not be greatly altered;

(5) The core and case materials in their respective barrels are acted upon by two plungers. These plungers can move at the same rate of speed because the two materials extruded have the same reduction in area as they pass from their respective barrels through the intermediate orifices. In other words, the extrusion ratios of both components are the same.

After extrusion from the novel compound die the coaxial element is removed to an oven and dried to evaporate the remaining xylene. The element is then ready for a sintering operation to remove the organic plasticizer. The essential features of the sintering process involve a sequence of atmosphere of vacuum, hydrogen and vacuum applied with temperatures ranging up to 1400° C. This process is carried out in an oven in three distinct periods corresponding to the intervals during which each of the above named atmospheres is utilized. Figure 9 shows diagrammatically the sintering schedule. The first period involves a vacuum of less than 1000 microns until the sintering temperature is reached.

Period 2 requires hydrogen either at partial or atmospheric pressure. Period 3 is a second vacuum heat treatment which should finish at a pressure of less than 100 microns. The entire sintering operation is followed by a final cooling period in vacuo. In detail the sintering process is as follows:

(1) The first period of the sintering operation is carried out in a vacuum to remove the major portion of the plasticizer by destructive distillation and prevent absorption of gases by the Zr, a powerful "getter" metal tending to form non-pyrophoric compounds. The particular synthetic rubber plasticizer referred to above is distilled off at 200–600° C. Here the vacuum pumps must pull the gases out rapidly and minimize the amount of carbon residue. Such a residue forms zirconium carbide reducing the pyrophoric properties of the core. The rate of temperature rise in this region is limited by the rate of distillation of the plasticizer and must be slow enough so that the pumps can keep the pressure under 1000 microns. Once the distillation is over the temperature may be raised to the desired top temperature. Period 1 is represented by interval A of Figure 9;

(2) The second period of the sintering operation is carried out in atmosphere produced by bleeding hydrogen into the furnace to maintain a pressure greater than 1000 microns or by shutting off the vacuum system and flowing hydrogen through the furnace at atmospheric pressure. The latter method is more practicable and also yields a more strongly reducing atmosphere for the reduction of iron oxides, forming a dense and strong ferrous case. At the top sintering temperatures of around 1000° C., Zr absorbs little hydrogen and most of that absorbed may be removed by a subsequent vacuum treatment at these temperatures without impairing the pyrophoric properties of the core. The time in hydrogen, interval B of Figure 9, should be at least ¾ hour;

(3) The third period, interval C of Figure 9, of the sintering operation is again carried out in a vacuum. The charge is kept heated until the vacuum reaches 100 microns or less. The vacuum is continued until the Zr core material has been outgassed and has become well sintered. The element is cooled in a vacuum since otherwise Zr would absorb large quantities of gas. After cooling the incendiary element can be removed from the furnace ready for use.

The times involved in all these three periods depend entirely upon the mass of material to be sintered and the pumping capacity of the vacuum system, and are not an essential feature of the disclosure. The resulting final element has however sufficient strength and ductility to be further cold-worked by hammering or rolling and sintered a second time, if desired to reduce porosity and increase strength. It is sufficiently strong to withstand explosive shocks and is very durable as far as oxidation or deterioration is concerned.

So far in this specification the process we have developed for the manufacture of pyrophors by the methods of powder metallurgy has been described in some detail. The main outlines of the process are shown in the flow diagram of Figure 8. This figure is believed self-evident. By way of illustration of the entire process the following example is given.

500 g. of −200 mesh electrolytic Fe powder, containing less than 0.25% carbon and less than 1.0% oxygen and having a mesh fraction of 14.5% −200 +270, 13.5% −270 +325, and 72.0% −325 mesh, was blended with 24.75 g. of $NiCO_3$ for one hour in a ball mill. This blend was mixed with 750 cc. of a xylene solution containing 30 g. of a synthetic rubber known as Perbunan. The slurry was evaporated for about two hours on a steam bath until the mass had a putty-like consistency. It was then extruded through a ¼" dia. orifice in a die having a 1" dia. barrel under a total load of about 1½ tons to give a pre-extruded rod. Pre-extrusion was repeated several times in order to give the mass as uniform a consistency as possible.

A mixture of Zr, Ti, and Pb powders totaling 75 g. and comprising 35% Zr, 30% Ti, and 35% Pb, all having a particle size of less than 15 microns with the exception of the Pb which was −200 mesh, was mixed with 65.6 cc. of the xylene solution containing 2.625 g. Perbunan. The slurry was evaporated on a steam bath in a manner similar to that described above. The mass was pre-extruded through the ¼" orifice to obtain a uniform texture.

The 500 g. mass of the Fe material was placed in the outer barrel of the co-extrusion die and the 75 g. mass of Zr material was placed in the inner barrel. These two weights were in the right proportion so that co-extrusion would start at once when the plungers contacted the masses. The total pressure on the co-extrusion die amounted to about 2 tons and extrusion proceeded slowly—to give a smooth surface and strong green strength. The compacted material could still be wound on a 3" dia. mandrel in the form of a helix with a pitch of ¼" per turn. The ¼" square element had a core area equal to about 15% of the area of the case. The mandrel with the helix was then dried in an oven at 80° C. for three hours to remove the residual xylene after which time it was mounted on a saddle for placement in the sintering furnace.

In the case of the example, heating was carried out by means of high frequency. The furnace consisted of a closed-end silica tube containing a sheet iron secondary for the heating element. The open end of the silica tube was connected to a series of vacuum pumps with a freezing trap interposed between furnace and pumps. A vacuum of 20 microns was drawn on the cold furnace at which time heating was started. The temperature was slowly raised at such a rate that the vacuum did not drop below 1000 microns and care was taken in passing through the 200 to 600° C. range where most of the Perbunan was distilled out of the extrusion. The temperature was then raised more rapidly until a top temperature of 1100° C. was reached. The total time required to reach this point was 1½ hours. Hydrogen was then admitted at atmospheric pressure, after purification, and the 1100° C. temperature was continued for 45 minutes. The hydrogen was then turned off and the vacuum pumps turned on. Vacuum sintering was continued for ¾ of an hour longer until a vacuum of less than 100 microns was obtained. Then the furnace was disconnected and the material allowed to cool to below 200° C. before withdrawal into the air.

The sample helix was approximately 6" long by 3" I. D. by 3½" O. D. and showed a good uniform gray surface with no warping. The Fe was sufficiently ductile to withstand hammering to as much as 25% reduction. When abraded the pyrophoric core sparked intensively.

The foregoing example was given solely by way of illustration. Other modifications will be apparent to those skilled in the art. In fact, we wish to be bound solely by the scope of the appended claims.

What we claim is:

1. The process of manufacturing porous zirconium incendiaries which comprises the following steps lettered in the order of their performance: (a) Mixing separately ingredients for making a zirconium pyrophor and a ferrous alloy, the ingredients for the zirconium pyrophor consisting of about 35% by weight of the total weight of zirconium powder of a predetermined fineness, about 30% by weight of titanium powder of a predetermined fineness and about 35% by weight of lead powder of a predetermined fineness, and the ingredients for the ferrous alloy consisting of electrolytic iron powder of predetermined fineness and $NiCO_3$ powder to the extent of 4–11% by weight of the iron; (b) adding separately to each powder mixture a xylene solution of an organic plasticizing agent; (c) evaporating separately and with constant stirring each xylene-powder mixture until the mixture has become plastic and dough-like; (d) extruding separately each dough-like mixture from a die to improve homogeneity of distribution of plasticizer throughout the powder; (e) inserting the iron mixture resulting from step (d) above into one barrel of a compound extrusion die adapted to extrude simultaneously and concentrically two plastic materials, meanwhile inserting the zirconium mixture from step (d) into a second barrel of the same die; (f) extruding simultaneously, concentrically and at the same rate of speed through concentric orifices the plastic mixtures positioned in step (e) in such a manner that the zirconium mixture forms a core of predetermined area enveloped in a case of the ferrous mixture; (g) continuing the extrusion of step (f) through a second orifice in the same die as that used in step (f) said second orifice adapted to impart a desired shape and area ratio to the now composite plastic rod-shaped mass; (h) removing the extruded mass to a drying oven and evaporating the remaining xylene under moderate heating; (i) removing the dried rod to a high temperature oven and there subjecting the same to successive vacuum, hydrogen, and vacuum atmospheres at a temperature of from 1000–1400° C. to destructively distill off the organic plasticizer and impart desired porosity and strength to the encasing ferrous material and porosity and pyrophoric properties to the zirconium mixture; (j) cooling the now sintered porous composite rod in vacuo before exposure to the atmosphere.

2. In a process for manufacturing jacketed incendiaries, the steps comprising separately mixing desired ingredients for a ferrous jacket and for a zirconium-rich pyrophoric core, all of said ingredients being in the highly comminuted state, adding to the resulting jacket and core mixtures an organic plasticizer, coextruding jacket and core materials through a forming and shaping extrusion die having concentric orifices, removing said organic plasticizer by destructive distillation in vacuo, sintering the now composite extruded element at elevated temperature in a hydrogen atmosphere, and cooling the rod in vacuo to prevent absorption of gases.

3. The process of manufacturing jacketed porous pyrophors which comprises the following steps lettered in the order of their performance: (a) Mixing separately the powdered ingredients for making a zirconium-rich pyrophor and a ferrous alloy; (b) adding a xylene solution of an organic plasticizing agent to each powder; (c) evaporating separately each xylene-powder mixture to a plastic, dough-like consistency; (d) extruding each dough-like mixture to uniformly distribute plasticizer throughout the powder mixture; (e) inserting the zirconium mixture in the center barrel of a co-axial extrusion die while inserting the ferrous mixture into the outer barrel; (f) extruding the plastic mixture simultaneously at the same rate of speed through concentric orifices so that the zirconium mixture forms a core surrounded by a jacket of ferrous mixture; (g) evaporating the xylene remaining in the rod; (h) removing the plasticizer from the rod by destructive distillation in vacuo at temperature in the range 200–600° C.; (i) sintering the dried rod at temperatures in the range 1000°–1400° C. in a hydrogen atmosphere; (j) cooling the rod in vacuo to prevent absorption of gases.

References Cited in the file of this patent
UNITED STATES PATENTS

| | | |
|---|---|---|
| 2,341,732 | Marvin | Feb. 15, 1944 |
| 2,437,625 | Taylor | Mar. 9, 1948 |
| 2,593,943 | Wainer | Apr. 22, 1952 |
| 2,659,135 | Leontis et al. | Nov. 17, 1953 |